United States Patent
Garner

(10) Patent No.: US 12,316,196 B2
(45) Date of Patent: May 27, 2025

(54) CASELESS ELECTRIC MOTOR WITH A STATIONARY SHAFT FOR MARINE ENVIRONMENTS

(71) Applicant: Garner Development Services, LLC, Irving, TX (US)

(72) Inventor: Steven George Garner, Winnipeg (CA)

(73) Assignee: Garner Development Services, LLC, Irving, TX (US)

( * ) Notice: Subject to any disclaimer, the term of this patent is extended or adjusted under 35 U.S.C. 154(b) by 0 days.

(21) Appl. No.: 18/811,160

(22) Filed: Aug. 21, 2024

(65) Prior Publication Data

US 2024/0413705 A1 Dec. 12, 2024

Related U.S. Application Data

(63) Continuation of application No. PCT/US2024/024623, filed on Apr. 15, 2024.

(60) Provisional application No. 63/554,831, filed on Feb. 16, 2024, provisional application No. 63/459,534, filed on Apr. 14, 2023.

(51) Int. Cl.
| | |
|---|---|
| H02K 7/14 | (2006.01) |
| H02K 1/20 | (2006.01) |
| H02K 1/278 | (2022.01) |
| H02K 3/28 | (2006.01) |
| H02K 7/04 | (2006.01) |
| H02K 15/165 | (2025.01) |

(52) U.S. Cl.
CPC .............. *H02K 7/14* (2013.01); *H02K 1/20* (2013.01); *H02K 1/278* (2013.01); *H02K 3/28* (2013.01); *H02K 7/04* (2013.01); *H02K 15/165* (2013.01); *H02K 2203/09* (2013.01)

(58) Field of Classification Search
CPC .. H02K 3/44; H02K 5/10; H02K 5/12; H02K 5/124; H02K 5/128; H02K 5/1285; H02K 5/132; H02K 7/14; H02K 9/06
USPC ............................................................ 310/87
See application file for complete search history.

(56) References Cited

U.S. PATENT DOCUMENTS

| | | | |
|---|---|---|---|
| 6,600,249 B2 | 7/2003 | Nelson et al. | |
| 6,606,578 B1 | 8/2003 | Henderson et al. | |
| 6,700,282 B2 * | 3/2004 | Mori | H02K 15/0081 |
| | | | 310/201 |
| 8,851,942 B2 * | 10/2014 | Yoshikawa | B63H 5/10 |
| | | | 60/221 |

(Continued)

FOREIGN PATENT DOCUMENTS

| | | | | |
|---|---|---|---|---|
| CN | 109639043 A | * | 4/2019 | ............. H02K 11/22 |
| EP | 3758196 A1 | | 12/2020 | |

OTHER PUBLICATIONS

Machine translation of CN-109639043-A (Year: 2019).*

(Continued)

*Primary Examiner* — Tulsidas C Patel
*Assistant Examiner* — Minki Chang
(74) *Attorney, Agent, or Firm* — Law Office of Bill Naifeh

(57) ABSTRACT

Embodiments of an electric motor are disclosed. In certain embodiments, the motor comprises, a stator, a rotor, and an impeller mechanically coupled to the rotor, the impeller comprising a central shaft having a longitudinal bore, a plurality of blades radially extended from the central shaft, and an engagement cylinder coupling the plurality of blades to the rotor.

22 Claims, 17 Drawing Sheets

(56) References Cited

U.S. PATENT DOCUMENTS

| | | | |
|---|---|---|---|
| 11,381,126 B1 | 7/2022 | Thomasson et al. | |
| 2003/0186601 A1* | 10/2003 | Collier | B63H 1/16 |
| | | | 440/66 |
| 2009/0102305 A1 | 4/2009 | Lu | |
| 2010/0119389 A1 | 5/2010 | Lazebnik et al. | |
| 2010/0187924 A1 | 7/2010 | Yagai et al. | |
| 2011/0297474 A1 | 12/2011 | Aono et al. | |
| 2012/0093668 A1 | 4/2012 | Gieras et al. | |
| 2020/0350791 A1 | 11/2020 | Le et al. | |
| 2023/0074750 A1 | 3/2023 | Muller | |

OTHER PUBLICATIONS

Ahmad; Motor stator busbars for EV traction motors; www.planetanalog.com/motor-stator-busbars-for-ev-traction-motors/; Aug. 30, 2023.

International Search Report and Written Opinion of the ISA/US, mailed Jul. 10, 2024, in connection with International Application No. PCT/US2024/024623.

Interplex; Realize new EV possibilities with our Motor Stator Busbar Innovation; Aug. 29, 2023.

Masoumi et al.; Manufacturing Techniques for Electric Motor Coils with Round Copper Wires; IEEE Access; vol. 10; pp. 130212-130223; Dec. 20, 2022.

Product Focus: Interplex Showcases Latest Motor Stator Busbar for EV Motors; Battery & Electrification Insider; Sep. 13, 2023.

Roulier et al.; Innovative Solutions to Connect Stator Main Windings in Rotating Machines via Circular Laminated Bus Bars; Power Electronics Note 4.

* cited by examiner

CASELESS ELECTRIC MOTOR WITH A STATIONARY SHAFT FOR MARINE ENVIRONMENTS

CROSS REFERENCE TO RELATED APPLICATIONS

This application is a continuation of International Application No. PCT/US2024/024623, filed Apr. 15, 2024, which claims the benefit of the filing date of U.S. provisional patent application Ser. No. 63/459,534, filed on Apr. 14, 2023, and U.S. provisional patent application Ser. No. 63/554,831, filed on Feb. 16, 2024, the disclosures of which are incorporated herein by reference for all purposes.

TECHNICAL FIELD

The invention relates in general to electric motors used in marine environments, and in particular to electric motors without a shaft or without a rotating center shaft.

BACKGROUND INFORMATION

The presence of a drive shaft for an impeller in the water intake flow of a watercraft can cause several problems. For instance, the shaft can disrupt the natural flow patterns of the water. This disruption can create turbulence and eddies, which may affect the efficiency of the impeller and the overall performance of the system. Turbulence can increase energy losses and reduce the effectiveness of the impeller in moving water through the system. Cavitation can also occur when the disruption caused by the shaft creates areas of low pressure within the water flow. This can lead to the formation of vapor bubbles, which collapse with force when they re-enter regions of higher pressure. Cavitation can also cause erosion and damage to the impeller blades, shaft, and other components, reducing their lifespan and efficiency.

Furthermore, the presence of a drive shaft in the water flow can result in uneven distribution of water to the impeller blades. This uneven distribution can lead to imbalances in the forces acting on the impeller, causing vibrations, noise, and reduced performance. The presence of drive shaft can also result in uneven wear on the impeller blades, leading to premature failure. The drive shaft also adds additional surface area to the flow path, increasing drag and frictional losses in the system. These losses can reduce the efficiency of the impeller and require more energy to overcome the resistance created by the shaft, leading to higher operating costs. Additionally, a shaft exposed to the water flow is susceptible to corrosion and erosion, particularly in corrosive or abrasive environments. Corrosion and erosion can weaken the shaft over time, leading to structural failure and potential catastrophic damage to the system.

Conventional impellers are usually placed in some form of bore within the flow path, but the blades are not attached to the wall of the bore. Overtime, the use of such impellers creates the ability for cavitation off the ends the impeller. Furthermore, the distance between the impeller ends and the surface of the bore may often create a "resistance barrier" or resistance zone that allows water subject to back pressure to actually flow back through this resistance zone-which reduces the efficiency of the overall system.

What is needed, therefore, is a motor that reduces or eliminates the need for a drive shaft propelling an impeller and which reduces or eliminates the resistance barrier between the impeller and the surfaces of the bore.

The features and advantages of the present disclosure will be readily apparent to those skilled in the art. While numerous changes may be made by those skilled in the art, such changes are within the spirit of the invention.

SUMMARY

In one embodiment, there is an electric motor comprising a stator assembly, a rotor assembly, and impeller coupled to the rotor assembly.

These and other features, and advantages, will be more clearly understood from the following detailed description taken in conjunction with the accompanying drawings. It is important to note the drawings are not intended to represent the only aspect of the invention.

DETAILED DESCRIPTION

Figure 1B:
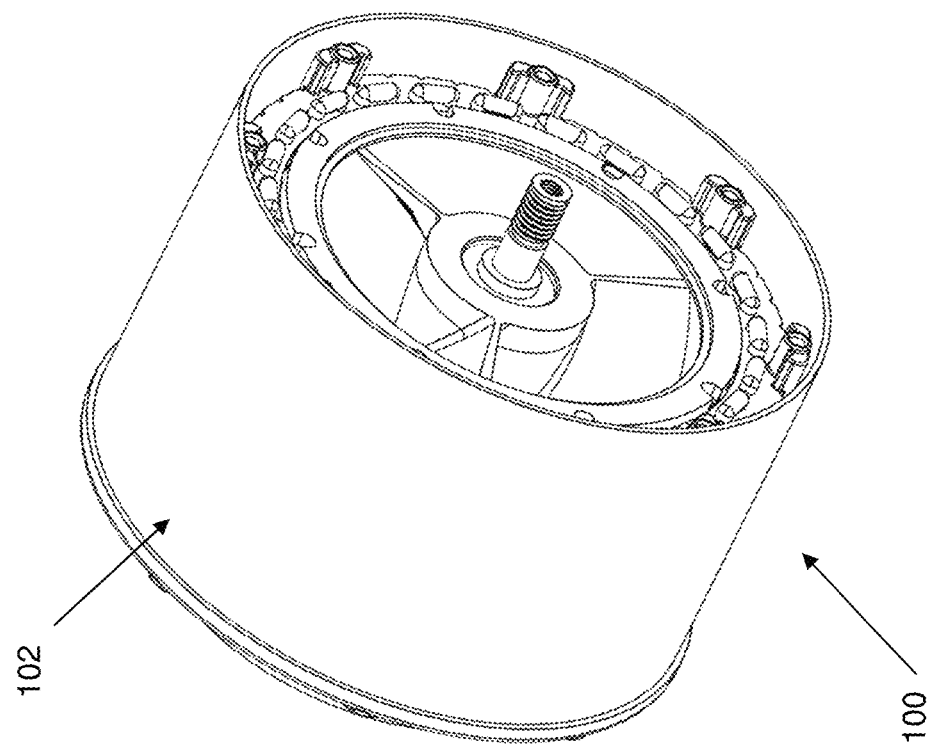
FIG. 1B is a rear or outflow isometric view of the embodiment of the motor illustrated in FIG. 1A.

For the purposes of promoting an understanding of the principles of the present inventions, reference will now be made to the embodiments, or examples, illustrated in the drawings and specific language will be used to describe the same. It will nevertheless be understood that no limitation of the scope of the invention is thereby intended. Any alterations and further modifications in the described embodiments, and any further applications of the principles of the inventions as described herein are contemplated as would normally occur to one skilled in the art to which the invention relates.

Specific examples of components, signals, messages, protocols, and arrangements are described below to simplify the present disclosure. These are, of course, merely examples and are not intended to limit the invention from that described in the claims. Well-known elements are presented without detailed description in order not to obscure the present invention in unnecessary detail. For the most part, details unnecessary to obtain a complete understanding of the present invention have been omitted inasmuch as such details are within the skills of persons of ordinary skill in the relevant art. Details regarding control circuitry or mechanisms used to control the rotation of the various elements described herein are omitted, as such control circuits are within the skills of persons of ordinary skill in the relevant art.

When directions, such as upper, lower, top, bottom, clockwise, counter-clockwise, are discussed in this disclosure, such directions are meant to only supply reference directions for the illustrated figures and for orientation of components in respect to each other or to illustrate the figures. The directions should not be read to imply actual directions used in any resulting invention or actual use. Under no circumstances, should such directions be read to limit or impart any meaning into the claims.

Figure 1A:
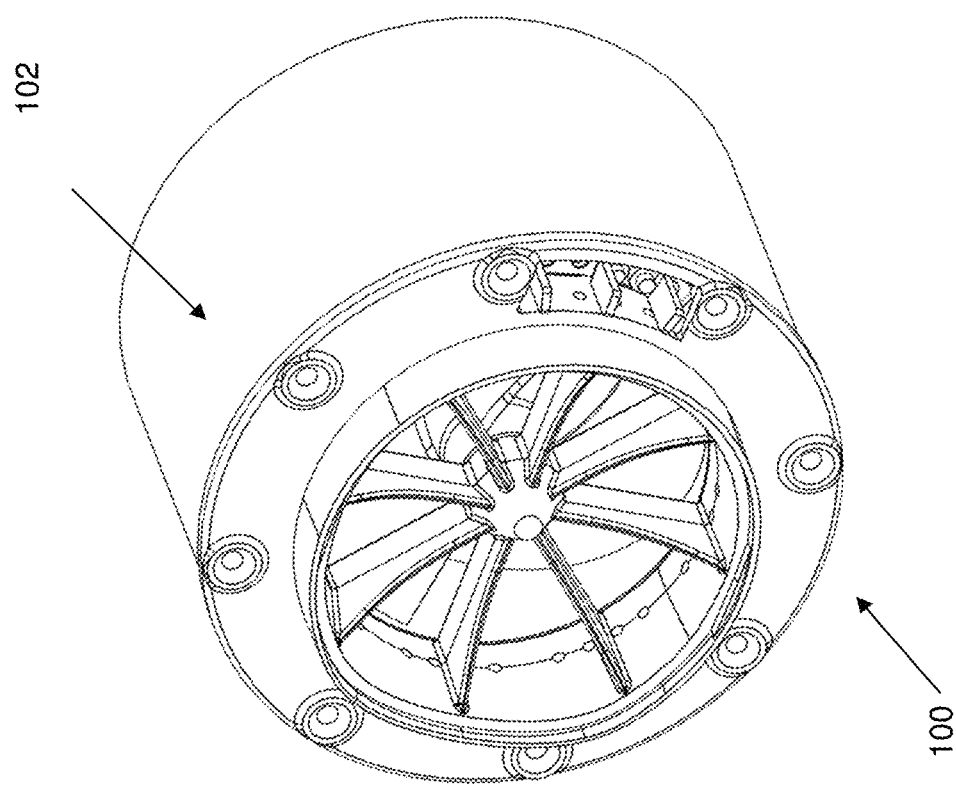
FIG. 1A is a front or inflow isometric view illustrating one embodiment of a motor which incorporates one or more aspects of the present invention.
Figure 1C:
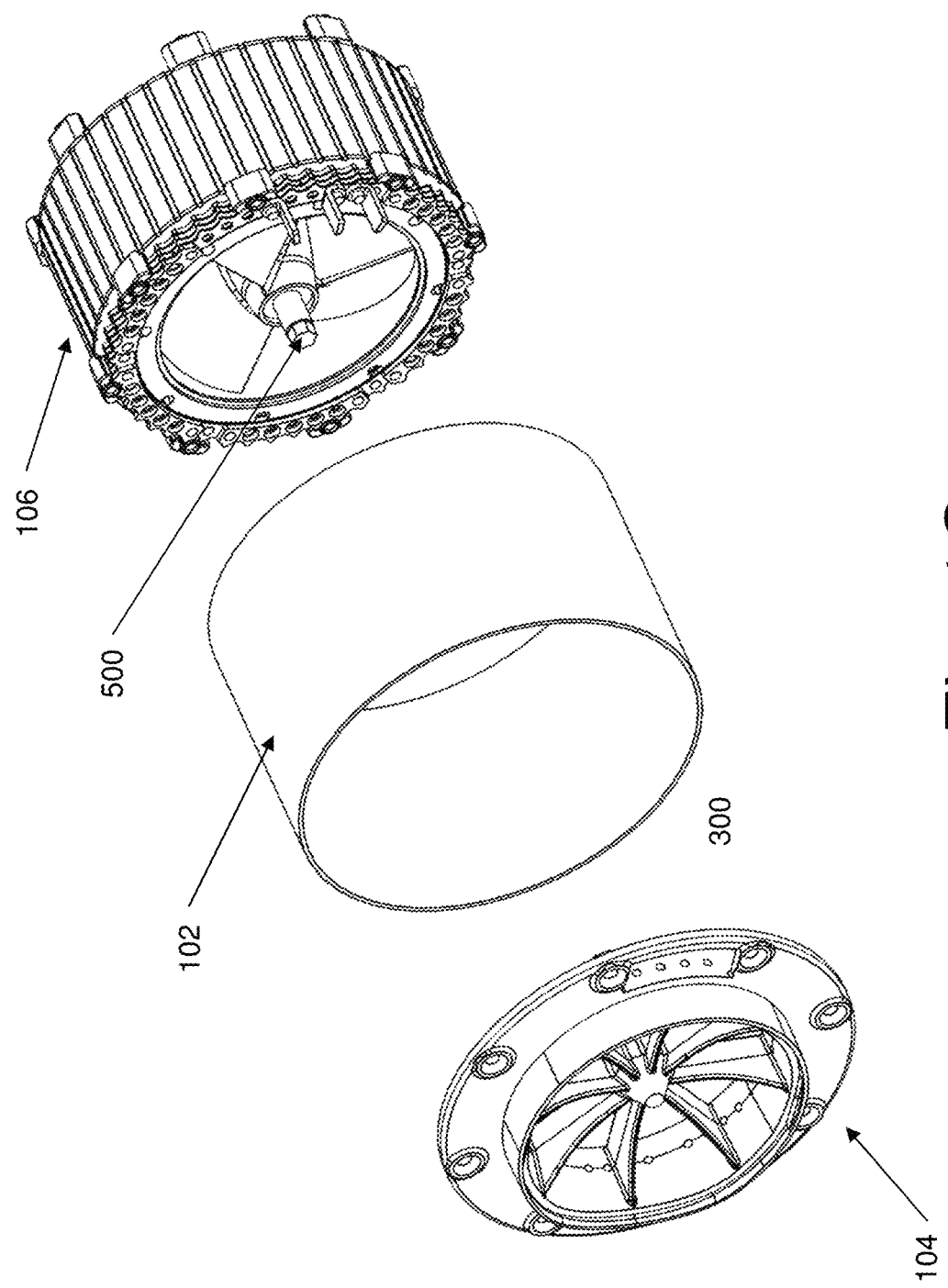
FIG. 1C is an exploded isometric view of the embodiment of FIG. 1A illustrating the certain components of the motor of FIG. 1A.

The Motor:

FIG. 1A, is a front, intake or inflow perspective view of one embodiment of a motor or motor assembly 100 which incorporates one or more aspects of the present invention. In contrast, FIG. 1B is a rear, discharge or outflow isometric view of the motor 100. FIG. 1C is an exploded isometric view of the motor 100 illustrating some of the components of the motor. As illustrated in FIG. 1C, there is presented the optional sleeve 102, a front or intake stabilizer 104, a motor assembly 106. In certain embodiments, the intake stabilizer 104 provides stabilization for a stabilizing shaft assembly 500, and is either designed to reduce the amount of hydrodynamic and/or aerodynamic drag on the intake side of the motor.

In FIGS. 1A and 1B, an optional sleeve 102 is shown wrapped around an exterior surface of the stator assembly 200 (see FIG. 2A below). In certain embodiments, the optional sleeve 102 may be formed from a thin layer material, such as carbon fiber. For instance, in an aquatic environment, the sleeve 102 creates a fluid path or "water jacket" around the motor so that water can flow between the exterior of the stator and the sleeve so that some of the heat generated from the operating motor 100 can be transferred to the surrounding water. In other situations, such as air-cooled applications, the optional sleeve 102 may be omitted entirely. The use of a carbon fiber jacket minimizes the overall diameter of the motor 100 while providing a fluid path for cooling the motor.

Figure 1D:
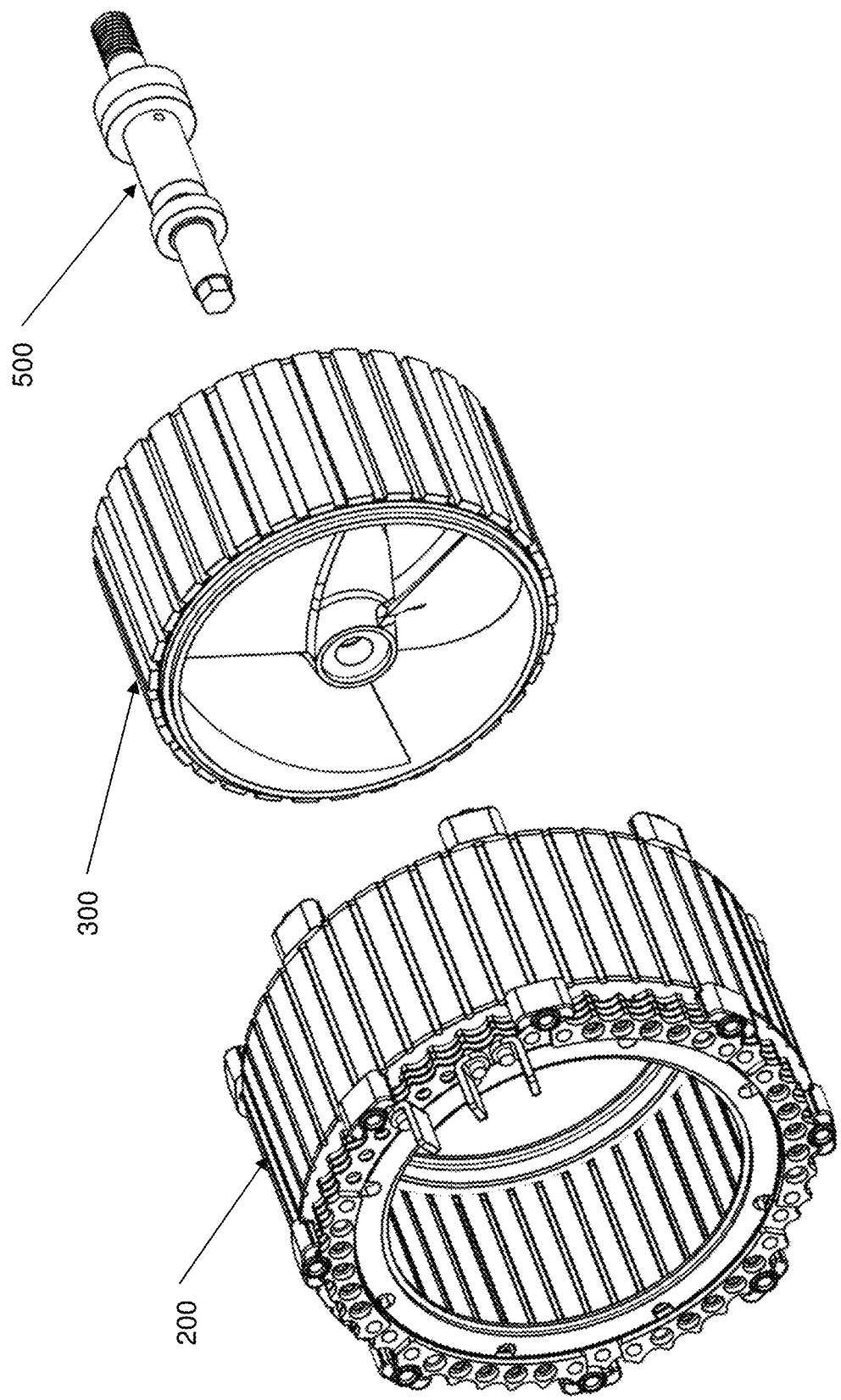
FIG. 1D is an exploded isometric view of the certain components of the embodiment of FIG. 1A.

The Motor Assembly:

FIG. 1D is an exploded isometric view illustrating one aspect of a motor assembly 106 which may be incorporated into the motor 100. As illustrated in FIG. 1D, the motor assembly comprises a stator assembly 200, a rotor assembly 300, and, in some embodiments, the stabilizing shaft assembly 500.

The Stator Assembly:

As is commonly known, a stator assembly is the stationary part of the motor assembly 100. FIG. 2A is an exploded isometric view from the front or inlet perspective illustrating one aspect of a stator assembly 200 which may be incorporated into the motor 100. Turning now to FIG. 2A, there is illustrated a stator core or stator yoke 202, plurality of coil windings or longitudinal bus bars 204, a front connector ring 206, a rear connector ring 208, a plurality of semi-circular busbars and insulating rings 210; a front main seal 212, a rear main seal 214, and electrical connectors, such as a three-phase power plug 216.

Figure 2A:
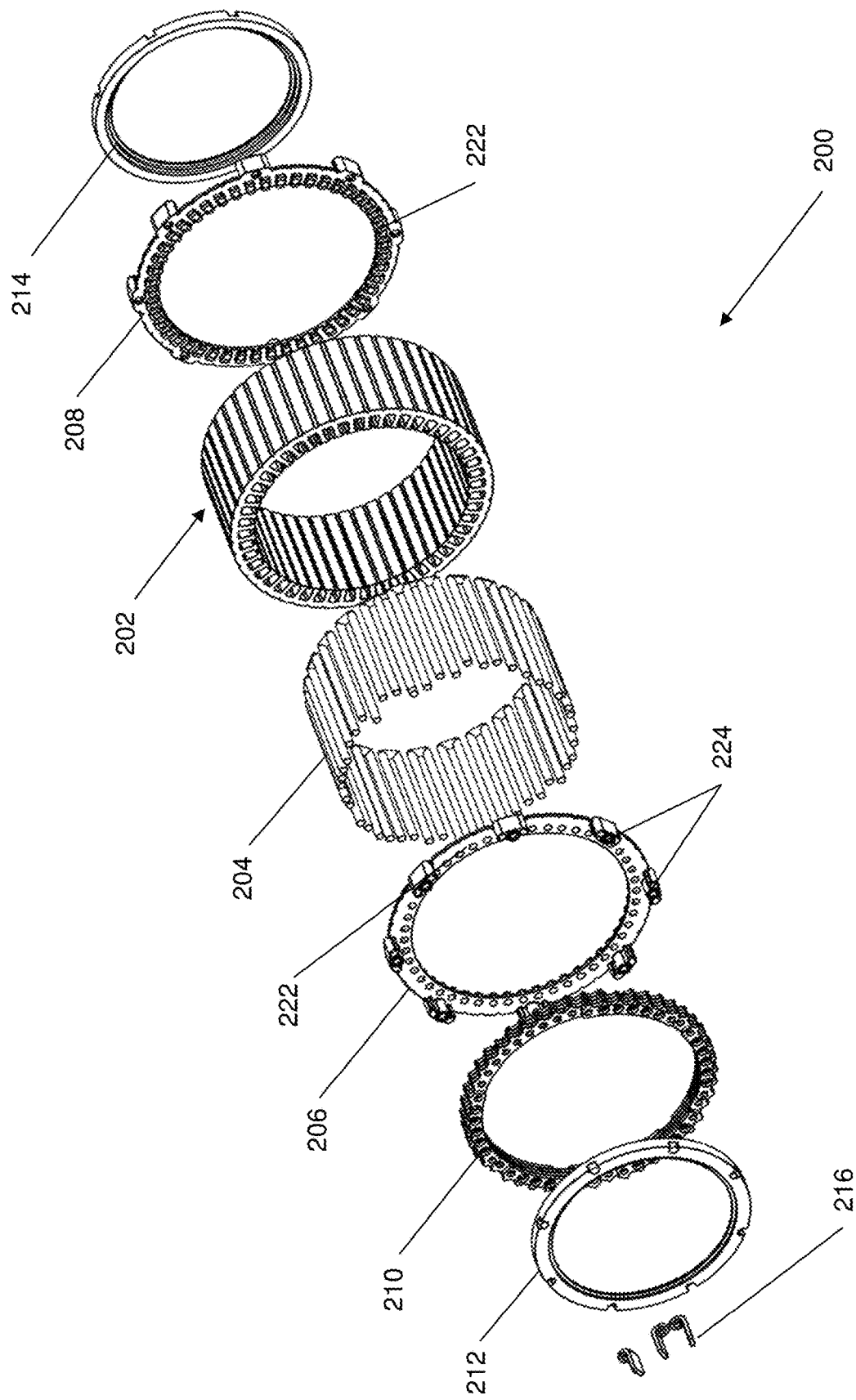
FIG. 2A is an exploded front perspective view illustrating one aspect of a stator assembly which may be incorporated into the motor illustrated in FIGS. 1A and 1B.
Figure 2B:
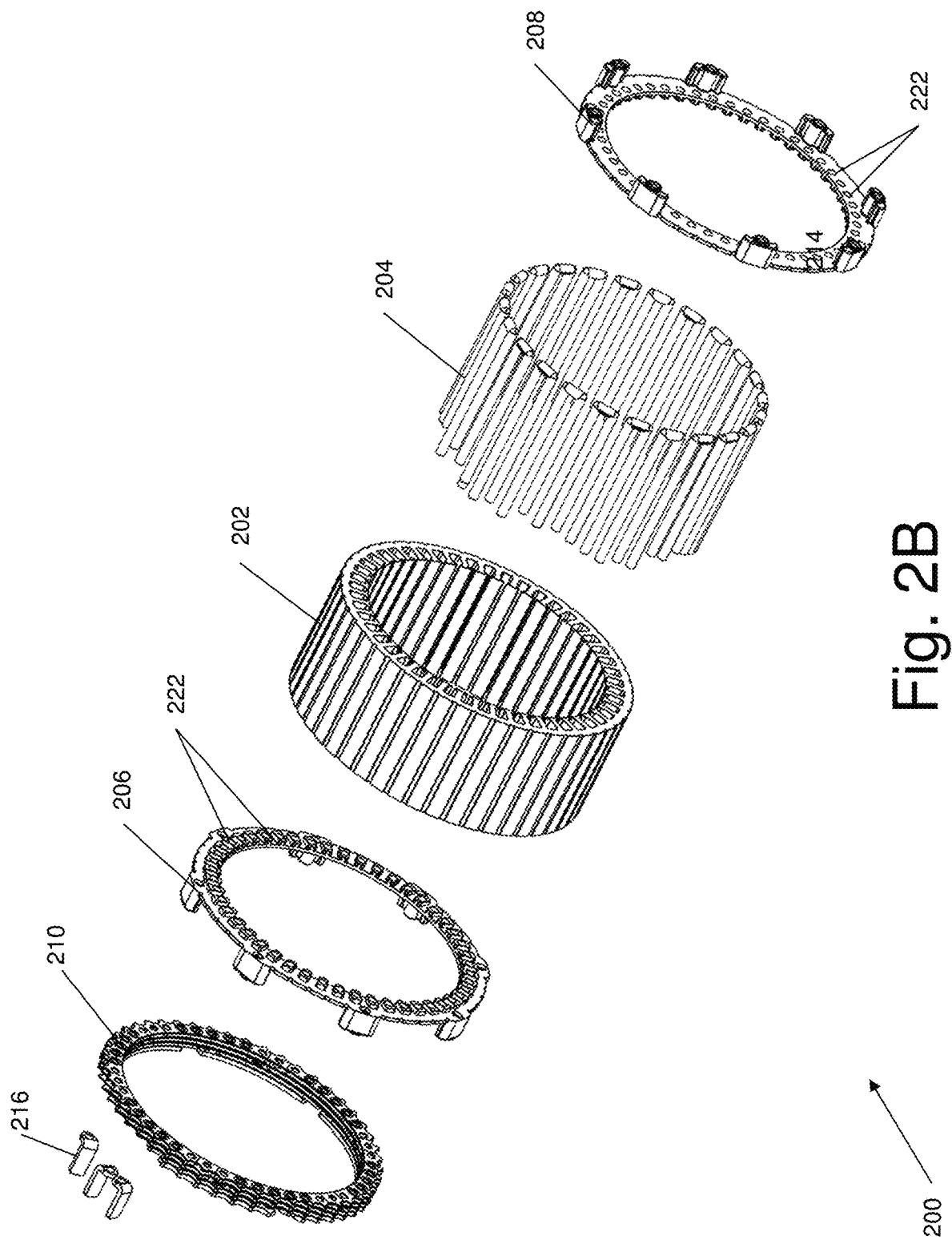
FIG. 2B is an exploded rear perspective view illustrating the stator assembly which may be incorporated into the motor illustrated in FIGS. 1A and 1B.

FIG. 2B is an exploded view of the stator assembly 200 from the rear or outlet perspective illustrating some of the primary structural elements of the stator assembly but with the main seals 212 and 214 removed for purposes of clarity. FIG. 2B illustrates the rear connector ring 208, the plurality of coil windings or longitudinal bus bars 204, the stator core 202, the front connector ring 206, the plurality of semi-circular busbars and insulating rings 210; and electrical connectors, such as the three-phase power plug 216.

Figure 2C:
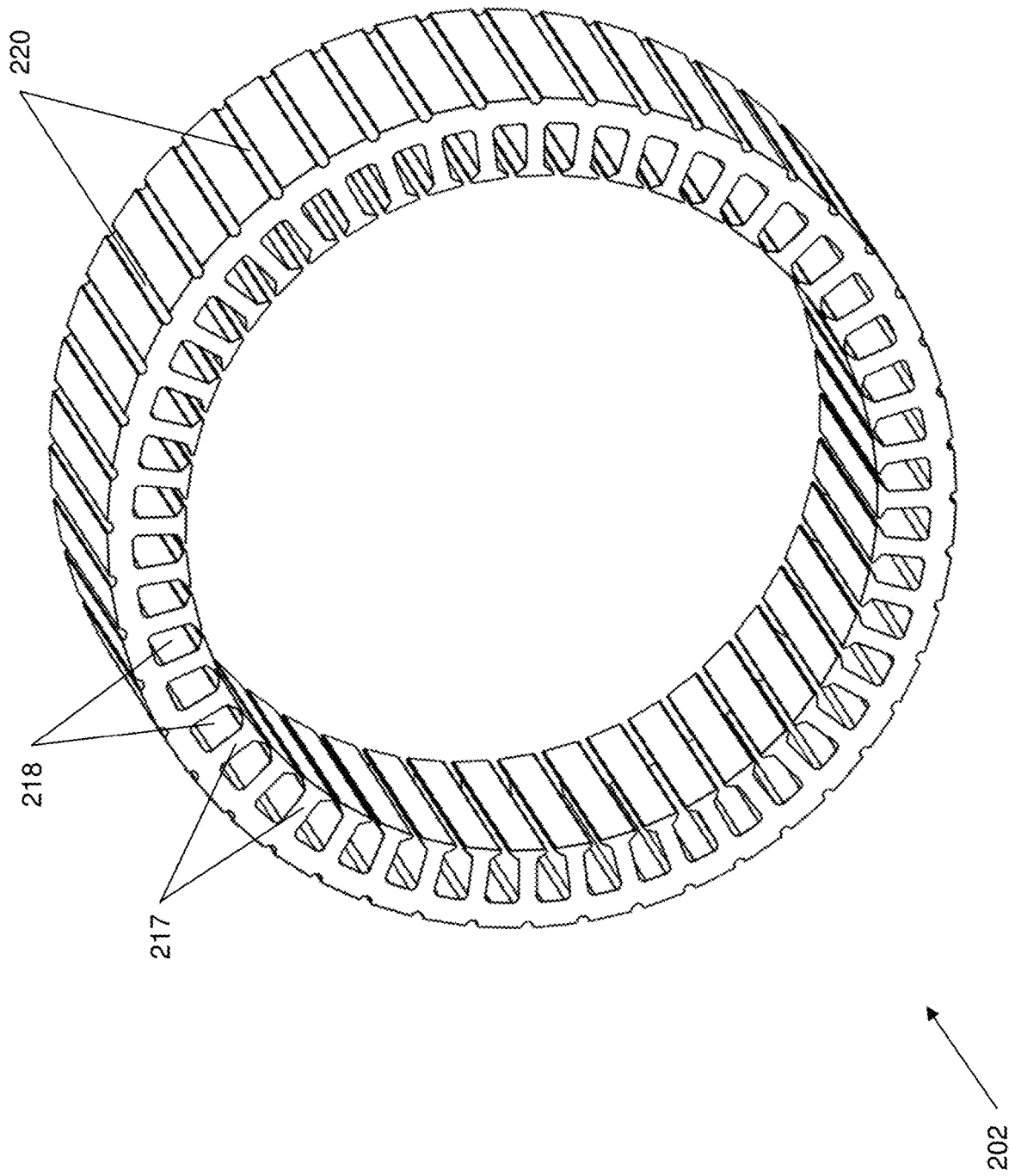
FIG. 2C is a detailed perspective view of a stator core used in the stator assembly of FIGS. 2A and 2B.

FIG. 2C illustrates a perspective view of the stator core or yoke 202 from a front or intake perspective. In certain embodiments, the stator core 202 may be formed from thousands of individual steel laminations or sheets (not shown) laminated longitudinally together. In certain embodiments, the laminations may be comprised of silica-steel or iron, cold-rolled and grain orientated as required by the specific application. In certain embodiments, the stator core 202 is built up as the laminations are placed side by side to form a ringed or complete circular layer. The next complete circular layer is positioned longitudinally adjacent to the layer but radially offset. Successive and offset circular layers are longitudinally placed next to the previous layers until the desired length of the core is reached-which forms a complete circular core as known in the art. As the magnetic field of an energized rotor passes through the stator core 202, the magnetic field creates a perpendicular flow of current (eddy currents) through the stator core. The laminations reduce and control the eddy currents to manageable amounts.

In certain embodiments, there may be a plurality of radially orientated inward projecting fingers 217 defining a plurality of stator slots 218 to confine and hold the plurality of coil windings or "hairpin" bus bars 204 (not shown in FIG. 2C). (In certain embodiments, "hairpin bus bars" are elongated U-shaped bus bars. In certain embodiments, the coil windings or hairpin bus bars 204 may be arranged into a three-phase configuration as is known the art. In other embodiments, additional phase configurations may be used depending on the design parameters of the specific application.

In certain embodiments, a plurality of longitudinal grooves 220 are defined on the exterior surface of the stator core 202. The longitudinal grooves 220 are circumferentially positioned about the exterior surface at positions where there will be no or minimal magnetic field generated by the coil windings or longitudinal bus bars 204. Thus, the longitudinal grooves 220 have minimum impact on the torque and efficiency of the overall motor 100. The use of the longitudinal grooves also reduces the overall weight of the stator core 202 without significantly impacting the effect of the magnetic field and/or performance of the motor 100.

In certain embodiments, the longitudinal grooves 220 may act as cooling channels which provide the ability to pass a liquid coolant over the exterior of the stator when needed. In situations where the stator core 202 is cooled with air, the longitudinal grooves 220 provide additional surface area for air cooling. In other situations, the longitudinal groves 220 become channels for liquids or a cooling substrate in any instances where the stator assembly 200 is sleeved with a cover (such as sleeve 102 of FIGS. 1A and 1B). Because the coolant can travel down these lines, the outer diameter (and overall weight) of the stator can be minimized without impacting the effect of the magnetic fields. In sum, the use of the longitudinal grooves 220 increases the surface area of the outside of the stator core 202 for cooling purposes and reduces the weight of the stator core 202 without sacrificing the effect of the magnetic field.

Turning back to FIGS. 2A and 2B, the front connector ring 206 includes aligning and positioning apertures 222 to align and position the plurality coil windings or busbars 204. Similarly, the rear connector ring 208 is designed to align and position to align and position the plurality coil windings or busbars 204. In certain embodiments, there may be a plurality of radially spaced in-line mounting structures 224 designed to couple with a plurality of mounting screws (not shown) to mount the motor 100 to a structure and stop the stator assembly 200 from rotating. The use of longitudinal or in-line mounting structures 224 adjacent to the coil windings or bus bars 204 further allows for the reduction of the overall outer diameter (and weight) of the motor 100 so that the outer diameter of the stator 200 is determined only by the magnetic mass required to achieve the desired torque.

Figure 2D:
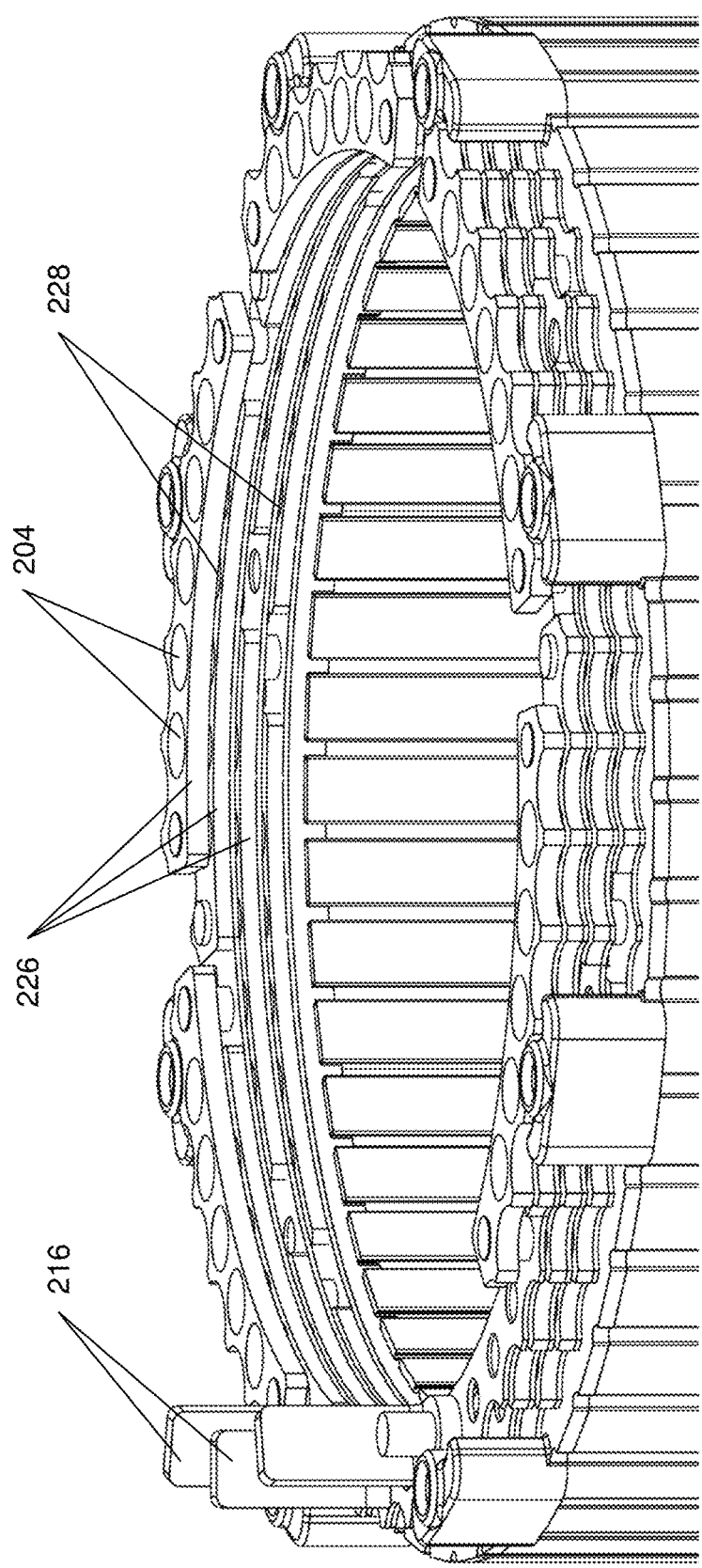
FIG. 2D is a detailed perspective view of a front end of a stator assembly of FIGS. 2A and 2B.

Turning now to FIG. 2D, there is a detailed view of the intake end of the stator assembly 200 with the front seal 212 removed for clarity. As illustrated, there are a plurality of the layered semi-circular connector bus bars 226 coupled (e.g. welded) to the ends of the coil windings or longitudinal bus bars 204 in a three-phase configuration. In other words, the longitudinal bus-bars 204 used in the first phase are electronically coupled together with a first plurality of connector bus bars 226. Similarly, the longitudinal bus-bars 204 used in the second phase are electronically coupled together with a second plurality of connector bus bars 226. Similarly, the longitudinal bus bars 204 used in the third phase are electronically coupled together with a third plurality of connector bus bars 226. The three-phase plug 216 may be coupled to a power supply which feeds a current to each of the respective phases via the specific connector bus bar group. In some embodiments, the connector bus bars 226 may be made of copper due to its excellent electrical conductivity. The layered arrangement helps to distribute the current evenly across the phases, reducing losses and assisting with efficient operation. There are also insulative spacers 228 sandwiched between the connector bus bars 226 to prevent shorting between the electrical current of each phase. In certain embodiments, these insulative spacers may be formed of fiberglass or another insulative material.

During assembly, once the stator core, coil windings, connector rings, and mounting inserts are aligned and positioned in a mold, an epoxy (not shown) can be applied to further secure the mounting inserts in place. In certain embodiments, the epoxy may seal the entire stator assembly making it ideal for aquatic applications. In some embodiments, the stator assembly may be powdered coated. Additional layers of epoxy may then be applied to prevent water or moisture exposure to the flat plates forming the stator core.

Figure 3B:
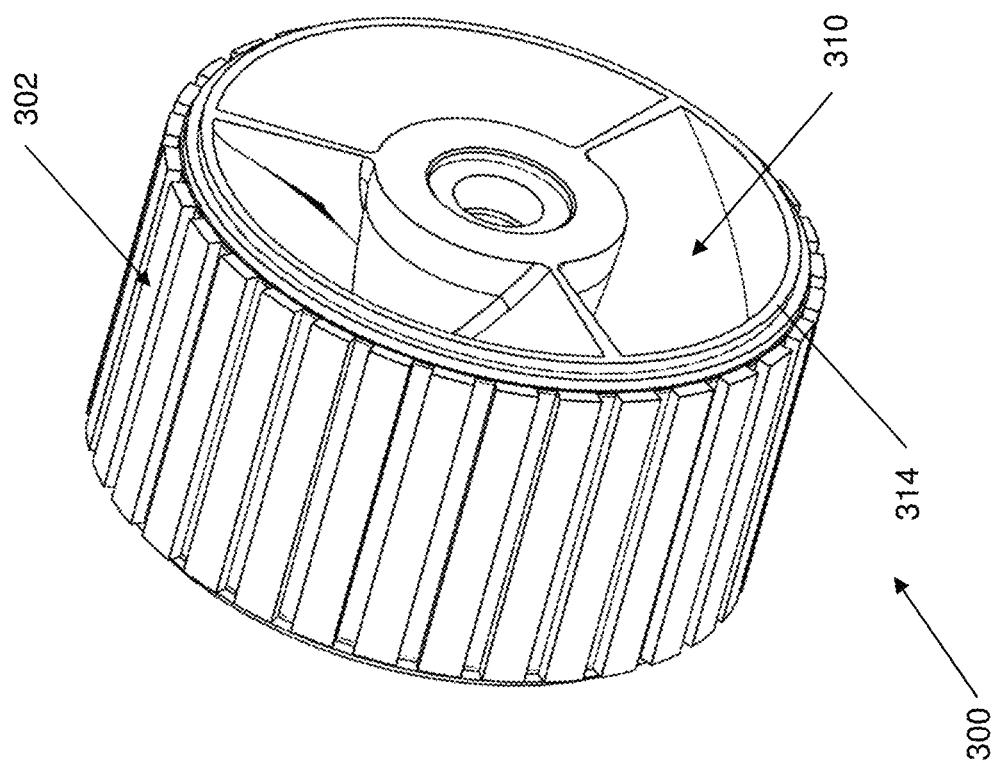
FIG. 3B is an exploded rear perspective view illustrating the rotor assembly which may be incorporated into the motor illustrated in FIGS. 1A and 1B.
Figure 3A:
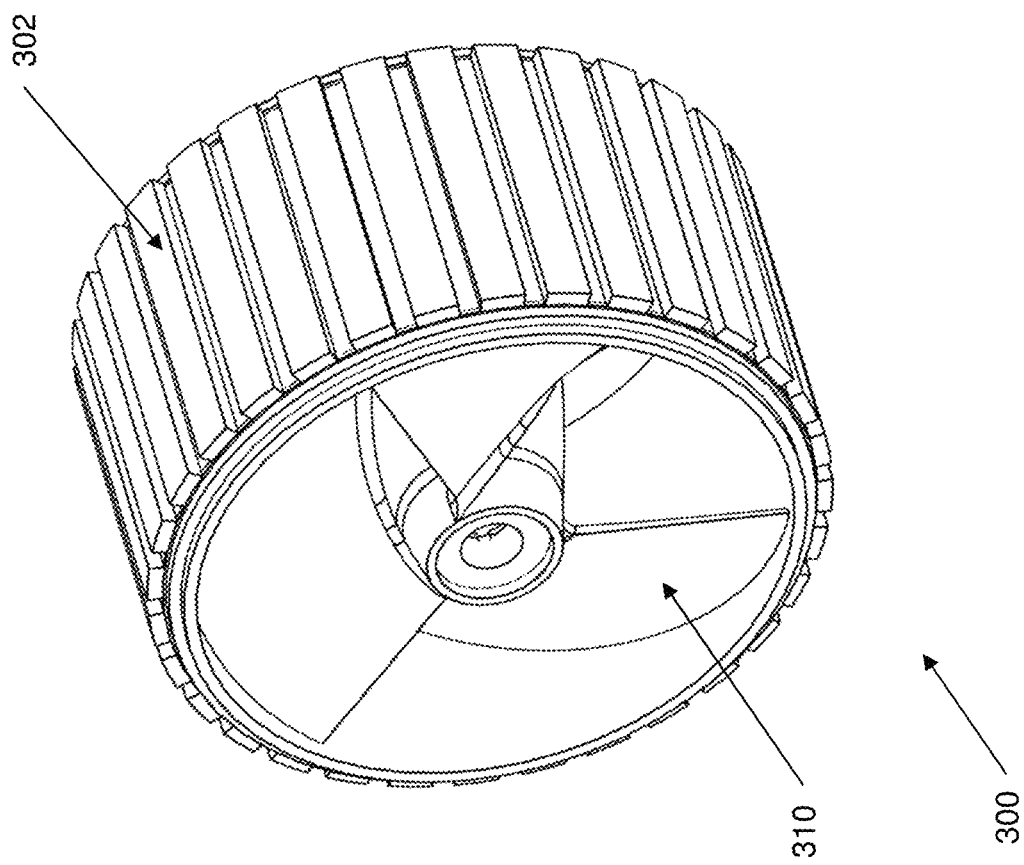
FIG. 3A is an exploded front perspective view illustrating one aspect of a rotor assembly which may be incorporated into the motor illustrated in FIGS. 1A and 1B.
Figure 3C:
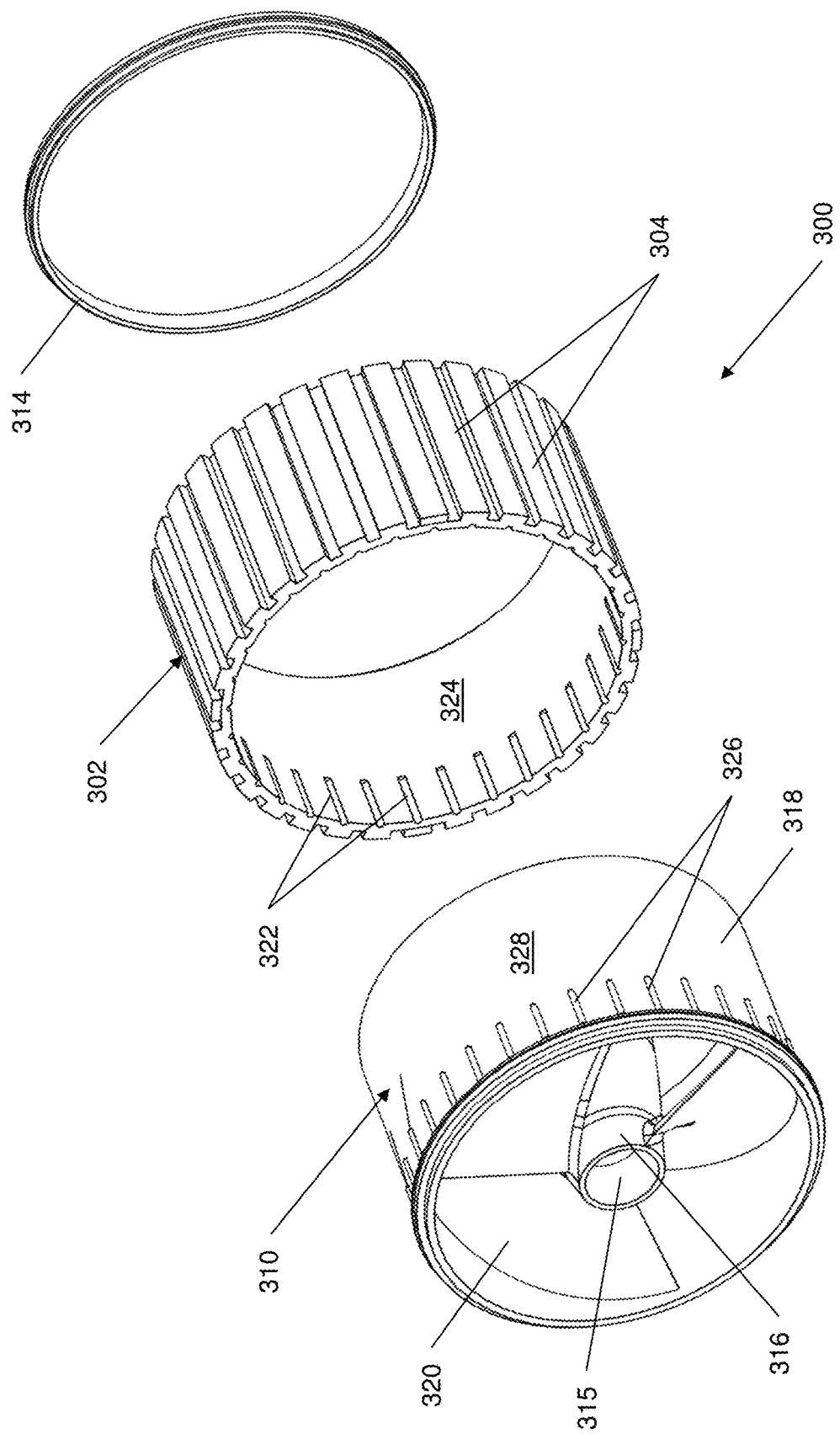
FIG. 3C is an front perspective exploded view of the rotor assembly of FIGS. 3A and 3B illustrating some of the primary structural elements of the rotor assembly.

The Rotor Assembly:

FIG. 3A, is a front, intake or inflow perspective view of one embodiment of the rotor assembly 300 which incorporates one or more aspects of the present invention. In contrast, FIG. 3B is a rear, discharge or outflow isometric view of the rotor assembly 300. FIG. 3C is an exploded view of the main components of the rotor assembly 300 from a front view perspective a magnetic rotor 302, an impeller 310, and a seal or o-ring 314.

The magnetic rotor 302 is a generally cylindrical unit or yoke formed of magnetic steel or steel laminated with magnets or magnetic material. In yet other embodiments, the rotor 302 may be formed from magnetic stainless steel. In certain embodiments the thickness of the cylindrical wall has been minimized to have just enough magnetic material to contain the magnetic field from the magnets. As will be explained below, in some embodiments, the cylindrical wall of the rotor yoke 302 can also be thinner than conventional rotor walls because the impeller 310 structurally supports the cylindrical wall.

In the illustrative embodiment, the magnetic rotor 302 includes a solid cylinder of ferromagnetic material having an exterior surface of an embedded or glued plurality of longitudinal permanent magnets 304 radially spaced around the exterior surface of the rotor 302. In certain embodiments, the permanent magnets may be wrapped and sealed in place. In certain embodiments, the magnets may be sealed with a spun layer of threads of carbon (not shown) and/or epoxy to keep the magnets in place to keep the magnets and the rotor yoke from being exposed to corrosive elements.

In some embodiments, there may be a plurality of radially spaced detents 322 defined within an interior surface 324 of the magnetic rotor 302. In some embodiments, the linear detents 322 may be radially spaced so as to minimize any influence on the magnetic fields generated by the magnets or magnetic material of the rotor 302.

In alternative embodiments, there may be a plurality of longitudinally orientated linear ridges (not shown) defined on the interior surface 324 of the magnetic rotor 302. In such embodiments, the linear ridges may be radially spaced so as to minimize any influence on the magnetic fields generated by the magnets or magnetic material. The plurality of linear ridges are designed to engage and mate with a plurality of longitudinal grooves defined in the exterior surface 328 of the impeller 310.

In yet other alternative embodiments, a non-magnetic rotor may be employed using a plurality of longitudinal bus bars encased in a non-magnetic structure to create an induction motor. In induction motor embodiments, a current is produced in the longitudinal bus bars which will create its own magnetic field. Such embodiments may also need metallic end rings to help complete the electrical circuit through the use of rotor bars allowing the generation of torque through electromagnetic induction.

In certain embodiments, the impeller 310 comprises a center shaft 316 with a longitudinal bore 315 defined therein, an outer cylindrical wall 318, and a plurality of blades 320 joining the center shaft to the cylindrical wall. In certain embodiments, the longitudinal bore 315 may be sized to accommodate the stabilizing shaft 502 (see FIG. 1D).

In certain embodiments a plurality of radially spaced longitudinal protrusions 326 extending from an exterior surface 328 of the impeller 310. The plurality of longitudinal protrusions 326 are sized, shaped, and designed to mate with the detents 322 of the magnetic rotor 302 when the magnetic rotor is slid over the impeller 310. When assembled, the protrusions 326 fit within detents 322 and transfer torque from the rotor 302 to the impeller 310.

In certain embodiments, the impeller 310 may be made of aluminum or other non-ferrous metal or material. The use of a non-ferrous material will have minimum impact on the magnetic fields of magnetic rotor 302. Additionally, the use of non-ferrous materials may act as a buffer and minimize any entrapment of free iron particles in the water or fluid passing through the impeller 310 so the particles do not adhere to the walls of the impeller. Furthermore, the use of non-ferrous materials will help to isolate the magnetic field. In certain embodiments, the seal 314 may be provided to prevent water or any other moisture from coming in contact with the mild steel of the rotor yoke 302.

In operation, an alternating current is supplied to the stator windings via the three phase plug and the connector bus bars, creating a rotating magnetic field. In embodiments using permanent magnets 304 in the rotor, the magnets are either attracted to repelled by the rotating magnetic field. The interaction between the magnets in the rotor and the rotating magnetic field of the stator generates a torque which causes the rotor to rotate with respect to the stator. In embodiments using an induction motor, currents in the rotor will cause magnetic fields to be generated. The interaction between the magnetic field of the stator and the magnetic field in the rotor generates torque, causing the rotor to rotate. This rotation drives the connected impeller 310, converting electrical energy into mechanical energy.

Figure 4A:
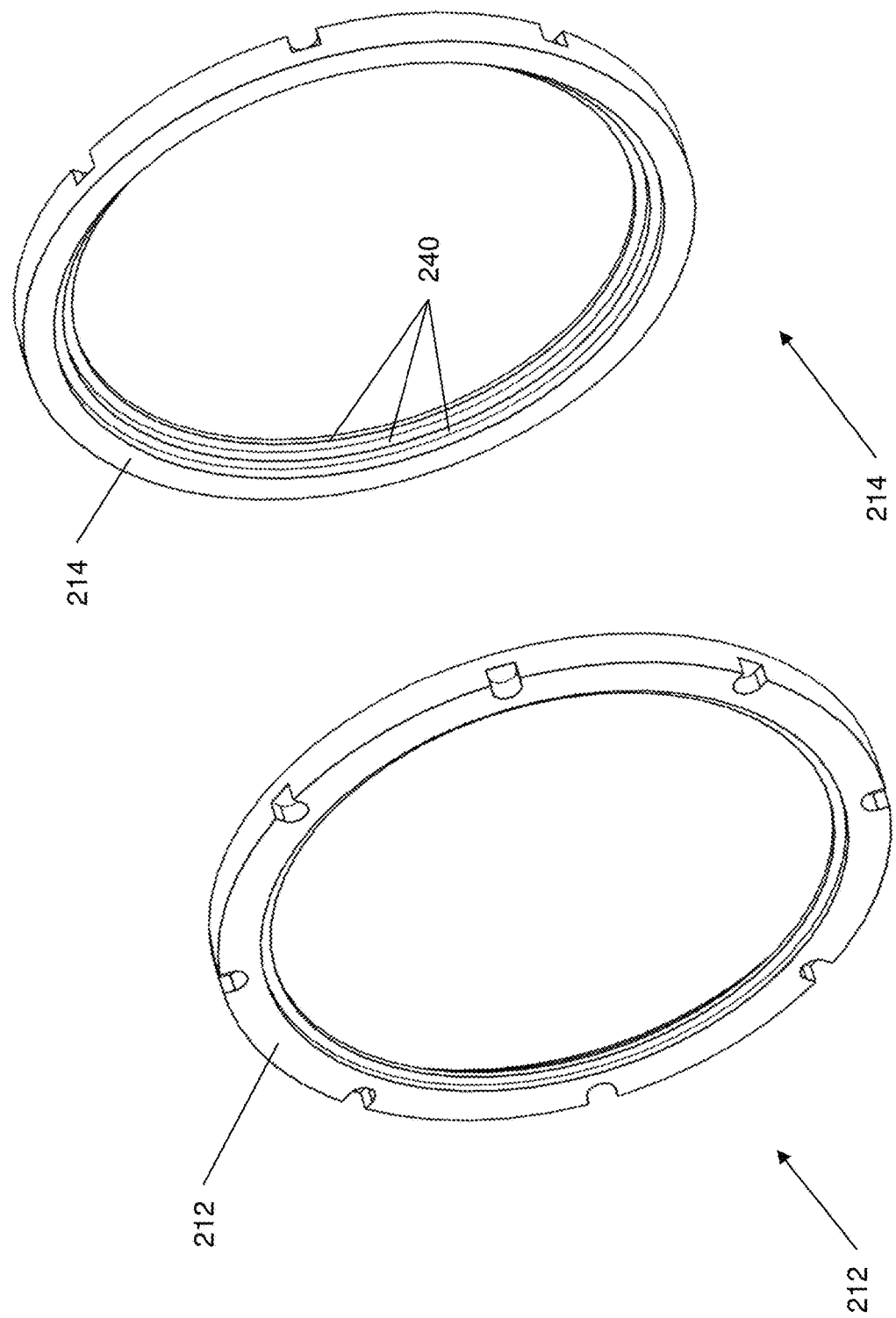
FIG. 4A are an exploded view of front and back seals which may be used in certain embodiments of the present invention.

End Seals:

FIG. 4A is an isometric view of the intake or front seal 212 and the discharge or rear seal 214 (see also FIG. 2A). In certain embodiments, the front and rear seals 212-214 are made from an ultra-high molecular weight polyethylene which has a low coefficient of friction.

Figure 4B:
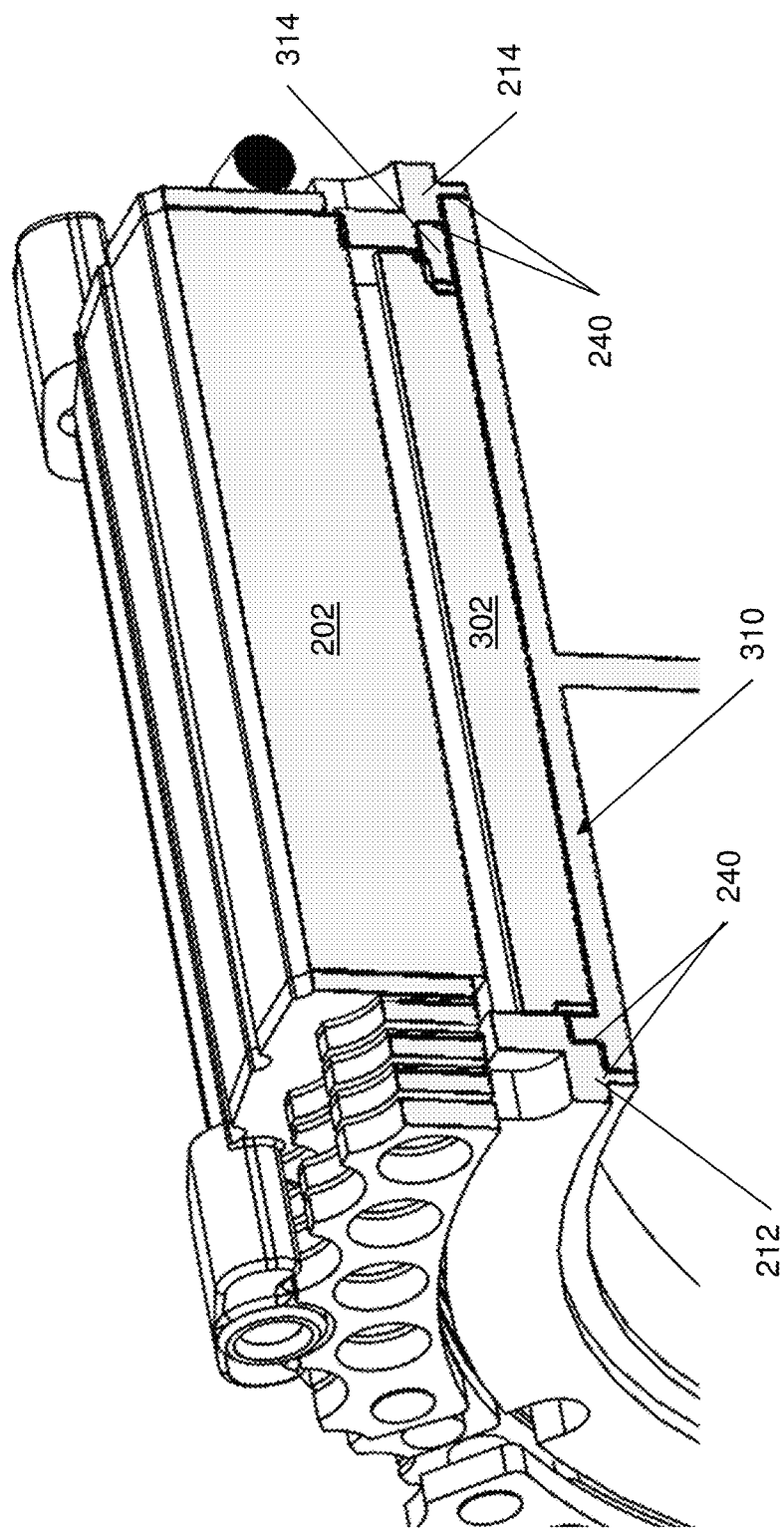
FIG. 4B is a detailed isometric section view illustrating the proximity relationship of the seals of FIG. 4A with elements of the rotor assembly and the stator assembly.

In certain embodiments, the seals 212-214 may have multi-step interior faces 240 designed to partially seal certain stator and rotor elements. FIG. 4B is a detailed isometric section rear view illustrating the proximity relationship of the seals 212 and 214 with impeller 310, the magnetic rotor 302, the stator core 202, and the seal 314 of the rotor assembly 300. The interaction between the multi-step interior faces 240, the impeller 310, and the rotor core 302 is also illustrated in FIG. 4B.

In certain embodiments, the primary seals 212 and 214 may not be completely waterproof. They are designed to filter out microparticles of steel, iron, sand, and low gravity solids from getting into the space between the magnetic rotor 302 and the stator core 202. The primary seals 212 and 214 may also provide some degree of rotational stabilization for the overall motor and prevents the exterior surface of the rotor from rubbing against the interior surface of the stator.

Figure 5A:
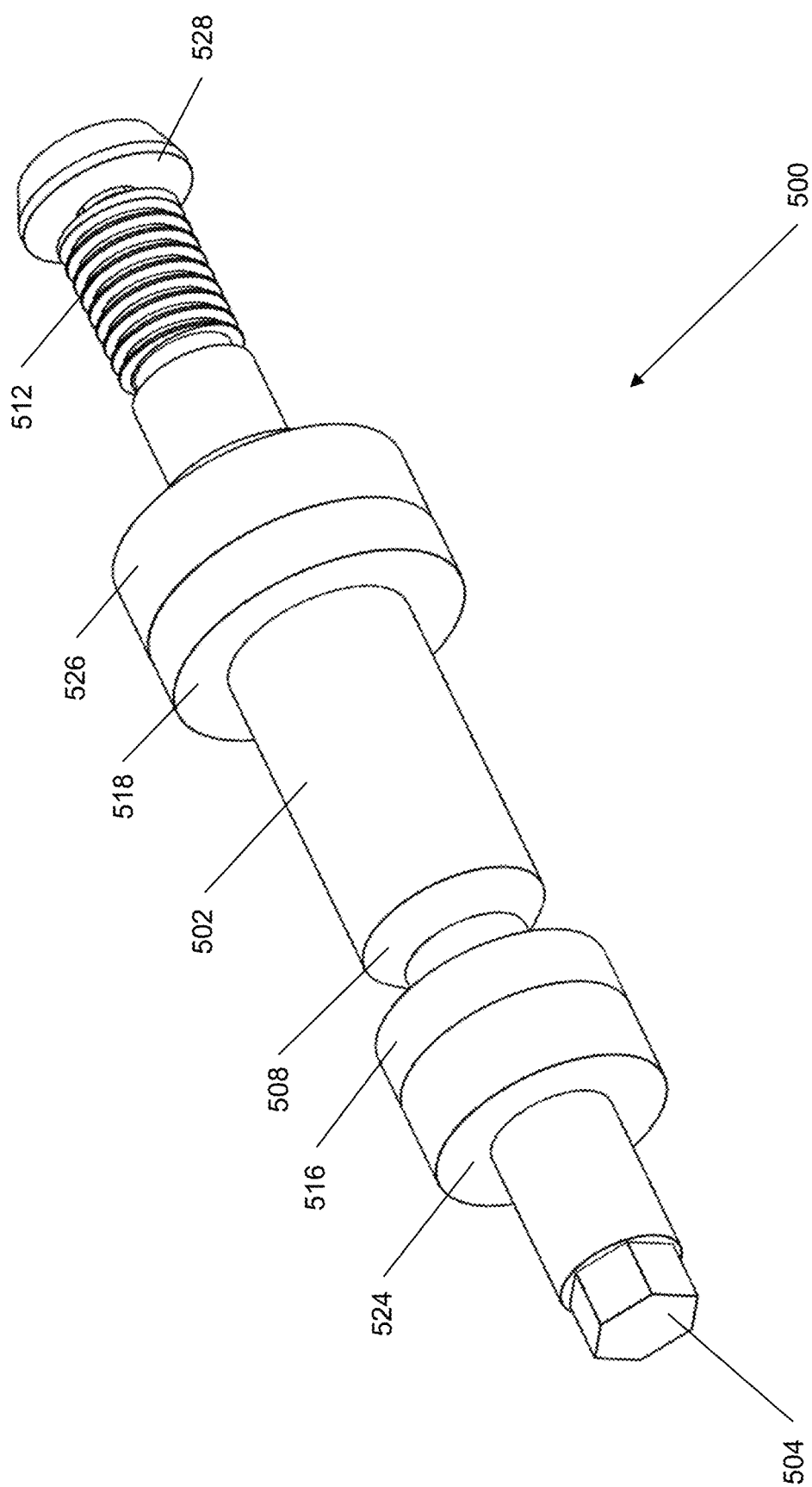
FIG. 5A is an isometric view illustrating one aspect of a shaft assembly which may be incorporated into a motor such as illustrated in FIGS. 1A and 1B.
Figure 5B:
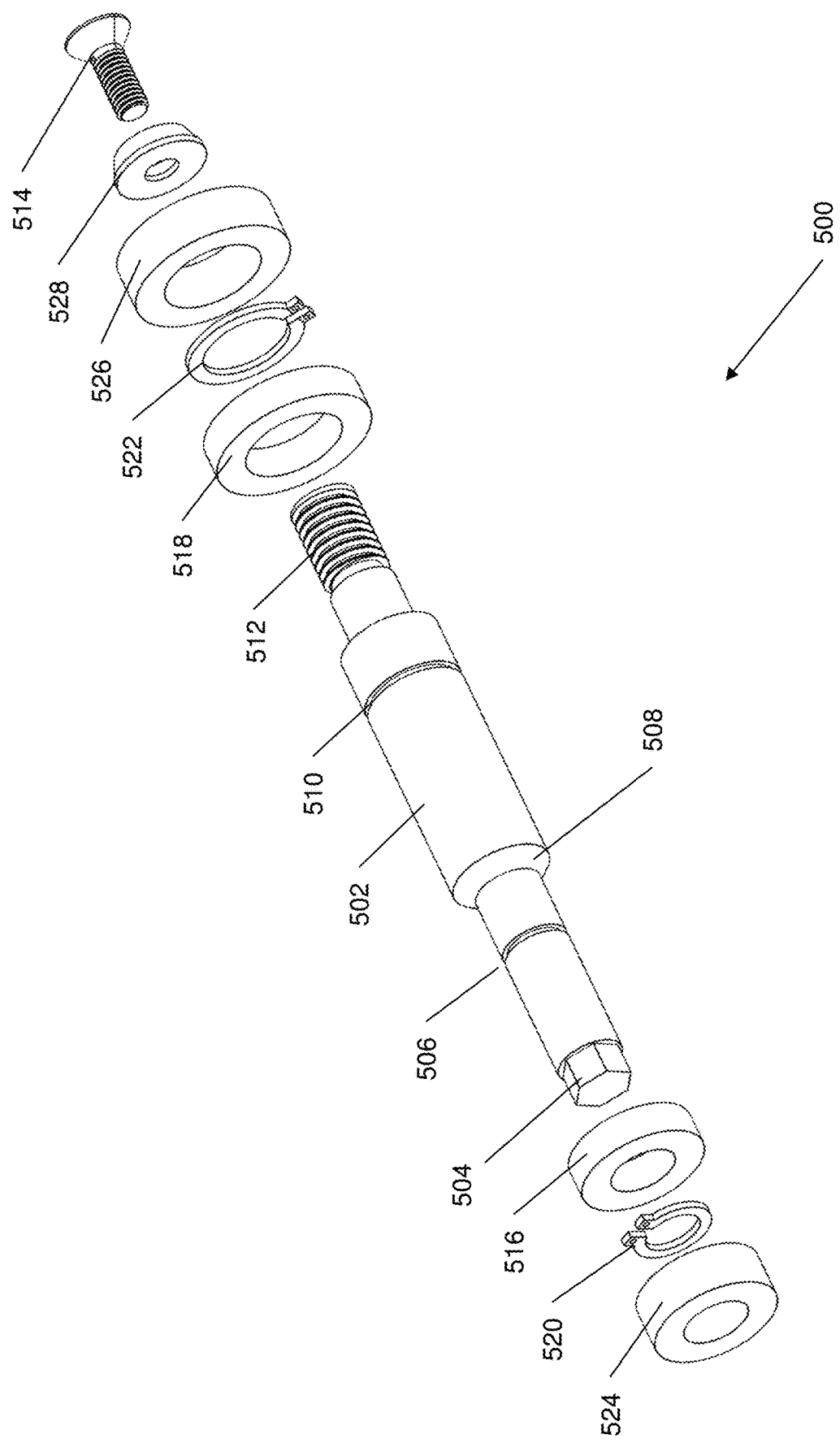
FIG. 5B is an exploded view of the shaft assembly of FIG. 5A illustrating some of the primary structural elements of the shaft assembly of FIG. 5A.

The Stationary Shaft Assembly:

FIG. 5A is an isometric view illustrating one aspect of a shaft assembly 500 which may be incorporated into the motor assembly 100 such as illustrated in FIGS. 1A, 1B, and 1C. FIG. 5B is an exploded view of the shaft assembly 500 illustrating some of the primary elements of the shaft assembly 500.

In certain embodiments, the stationary shaft 502 may be formed from a lightweight non-ferrous metal such as titanium. In certain embodiments, one function of the stationary shaft 502 is to assist with balance of the impeller 310 and/or rotor assembly 300 when rotating. In other words, the stationary shaft 502 may act as a stabilizer for the impeller and/or rotor assembly.

In certain embodiments, the intake or front end of the stationary shaft 502 may include a male end 504 designed to fit within a similarly shaped and sized female aperture (not shown) defined within an interior face of the intake stabilizer 104 (FIG. 1A). This coupling between the male end 504 and the aperture defined in the intake stabilizer 104 provides an additional amount of stabilization to the stationary shaft 502 and the impeller 310.

In certain embodiments, the front portion of the shaft has a first diameter and may have a first circumferential groove 506 defined therein. In certain embodiments, the diameter of the stationary shaft 502 may change to provide additional stabilization as the application requires. As illustrated, the diameter of the stationary shaft 502 transitions from a first, or smaller diameter, to a second or larger diameter around transition section 508. There may also be a second circumferential groove 510 defined in this larger diameter section.

In order for the impeller 310 to rotate smoothly around the stationary shaft 502, there may be one or more circular bearing assemblies placed longitudinally along the shaft. In the illustrative embodiment, there is a front bearing assembly 516 and a rear bearing assembly 518. In certain embodiments, the bearings in the bearing assemblies 516-518 may be made stainless steel or similar material which have a limited amount of play due to tight tolerances. The bearing assemblies 516-518 allows the impeller 310 to spin on its center as far to the outside edges as possible but still have the ability to stop spinning when needed. The front bearing assembly 516 may be longitudinally retained with a retaining ring or clip 520 which is designed to couple with the circumferential groove 506. Similarly, the rear bearing assembly 518 is longitudinally retained with a retaining ring 522 which is designed to couple with the circumferential groove 510.

In certain embodiments, the discharge or rear end of the stationary shaft 502 may include a male threaded end 512 designed to couple with a pump housing, a transmission, or even a fixture attachment point (depending on the application). In the illustrated embodiment, a threaded central bore (not shown in FIG. 5A or 5B) is defined in the discharge end of the stationary shaft 502 for accepting a retaining screw, such as retaining screw 514.

Figure 5C:
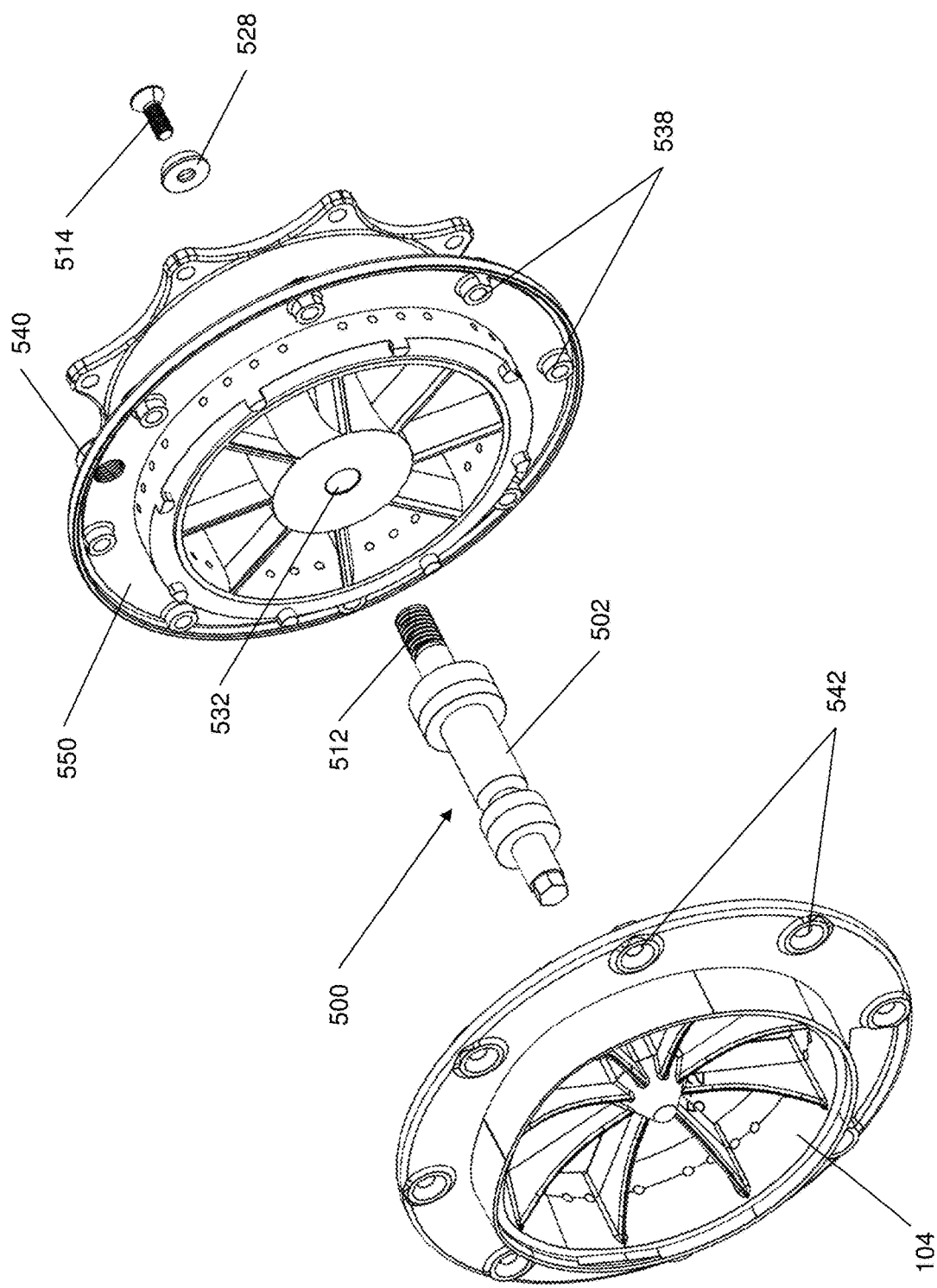
FIG. 5C is an exploded view of some components illustrating the relationship of the shaft assembly to certain components of the motor and a housing portion.

FIG. 5C is an exploded view of certain components illustrating coupling the shaft assembly 500 to a portion of a pump housing 550. In contrast, FIG. 5D is detailed section view of the shaft assembly 500 positioned within the center shaft 316 of the impeller 310 illustrating the positional relationship of the various elements of the shaft assembly 500 and the interior of the center shaft 316 of the impeller.

Figure 5D:
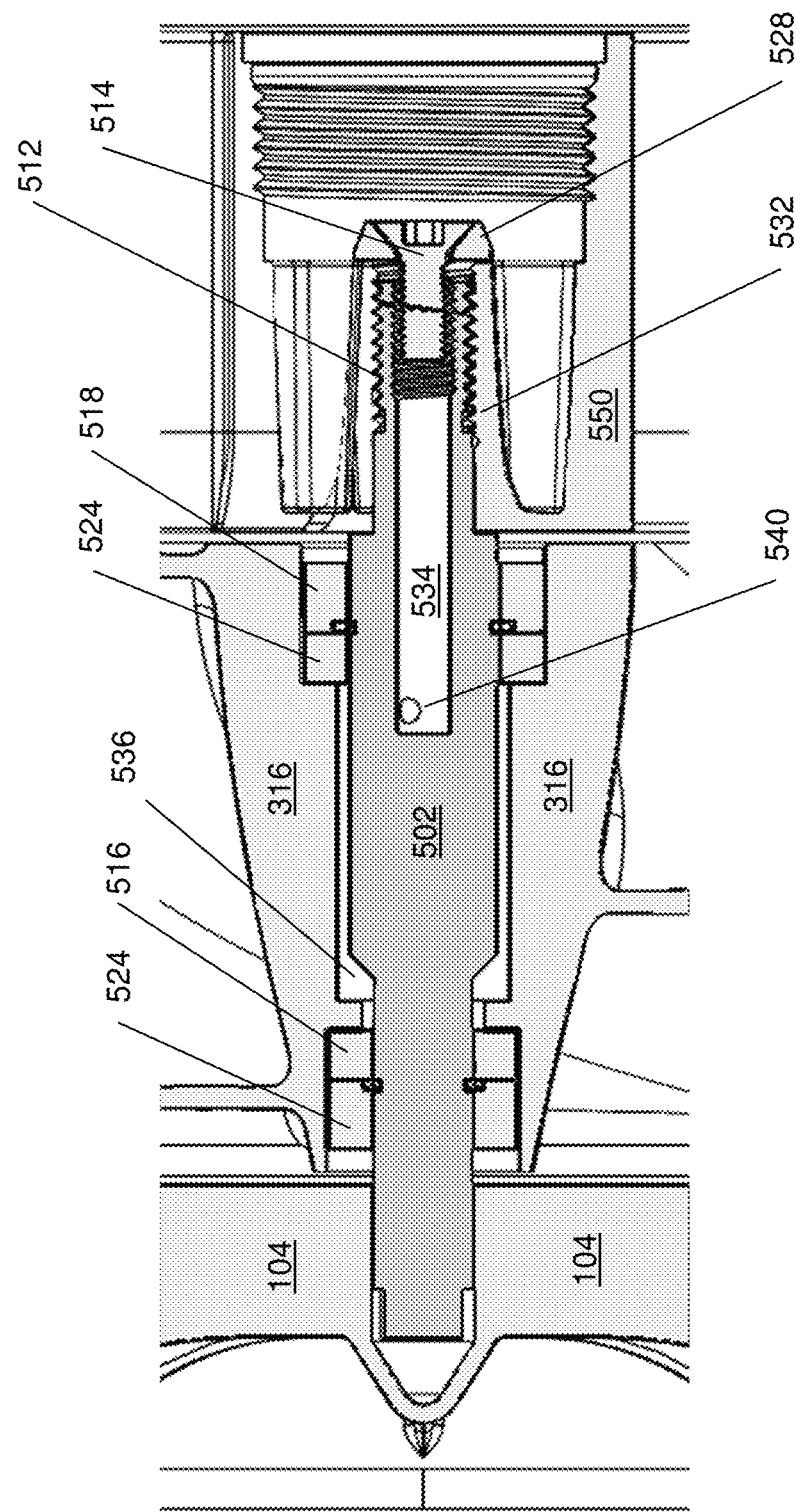
FIG. 5D is a section view of the shaft assembly of FIG. 5A coupled to the shaft of an impeller.

As illustrated in FIGS. 5C and 5D, a threaded center bore 532 of the pump housing 550 mates with the threaded male end 512 of the stationary shaft 502. In certain embodiments, the stationary shaft 502 defines a central bore 534 which may be threaded at the discharge end to accept a stopper screw 514.

To lubricate the bearing assemblies and the surrounding areas, oil and/or grease may be injected into the threaded end of the central bore 534 when the stopper screw 514 is removed. The oil and/or grease can be pushed into the central bore 534 and flow into an oil/grease aperture 540 which allows oil or another lubricant to flow through the central shaft 502 and into the space 536 between the shaft 502 and the impeller shaft 316 to lubricate the space and the bearing assemblies 516 and 518 from the inside and outside of the shaft. The space 536 (FIG. 5D) surrounding the shaft 502 and the bearing assemblies 516-518 may be sealed with the front seal or o-ring 524 and a rear seal or o-ring 526 to contain the grease or other lubricants in the space 536 between the seals. In certain embodiments, a rear washer 528 may be used to retain the oil and other lubricants when the stopper screw 514 is inserted back into the threaded portion of the central bore 534.

Referring back to FIGS. 2A and 2B, the retaining ring 208 include a plurality of radially spaced in-line mounting structures 224 designed to couple with a plurality of mounting screws (not shown) to mount the motor 100 to a structure such as the pump housing 550. Consequently, as illustrated, the pump housing portion 550 includes a plurality of radially spaced apertures 538 so screws or other fixation devices can extend through the apertures and into the mounting structures 224 of the retaining ring 208 further coupling the motor 100 to the pump housing portion 550.

In certain embodiments, the intake stabilizer 104 also includes a plurality of radially spaced apertures 542 so screws or other fixation devices can extend through the apertures and into the mounting structures 224 of the retaining ring 206 to mount the intake stabilizer to the motor 100.

Figure 5E:
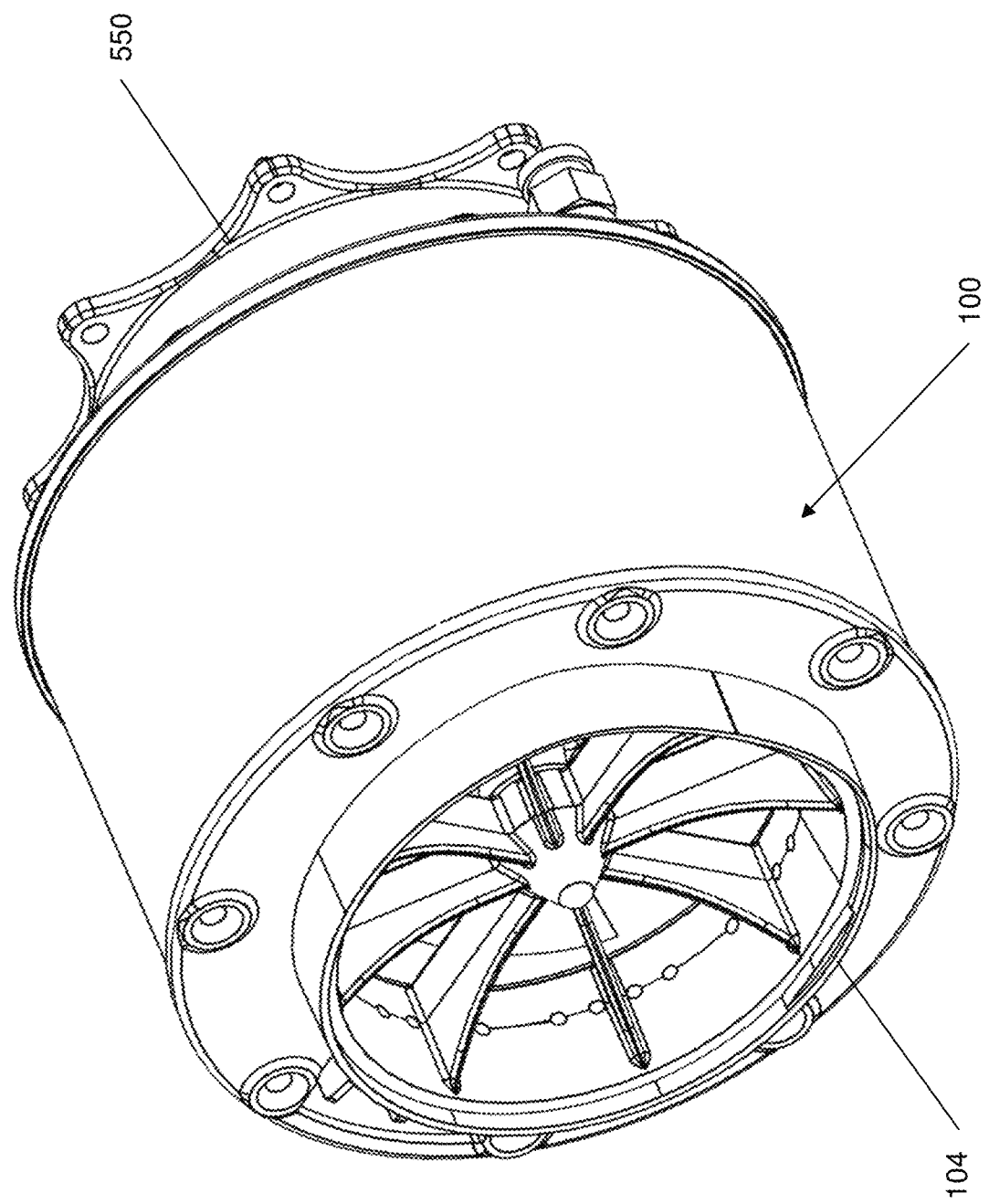
FIG. 5E illustrates an assembled motor assembly coupled to a housing portion.
Figure 5F:
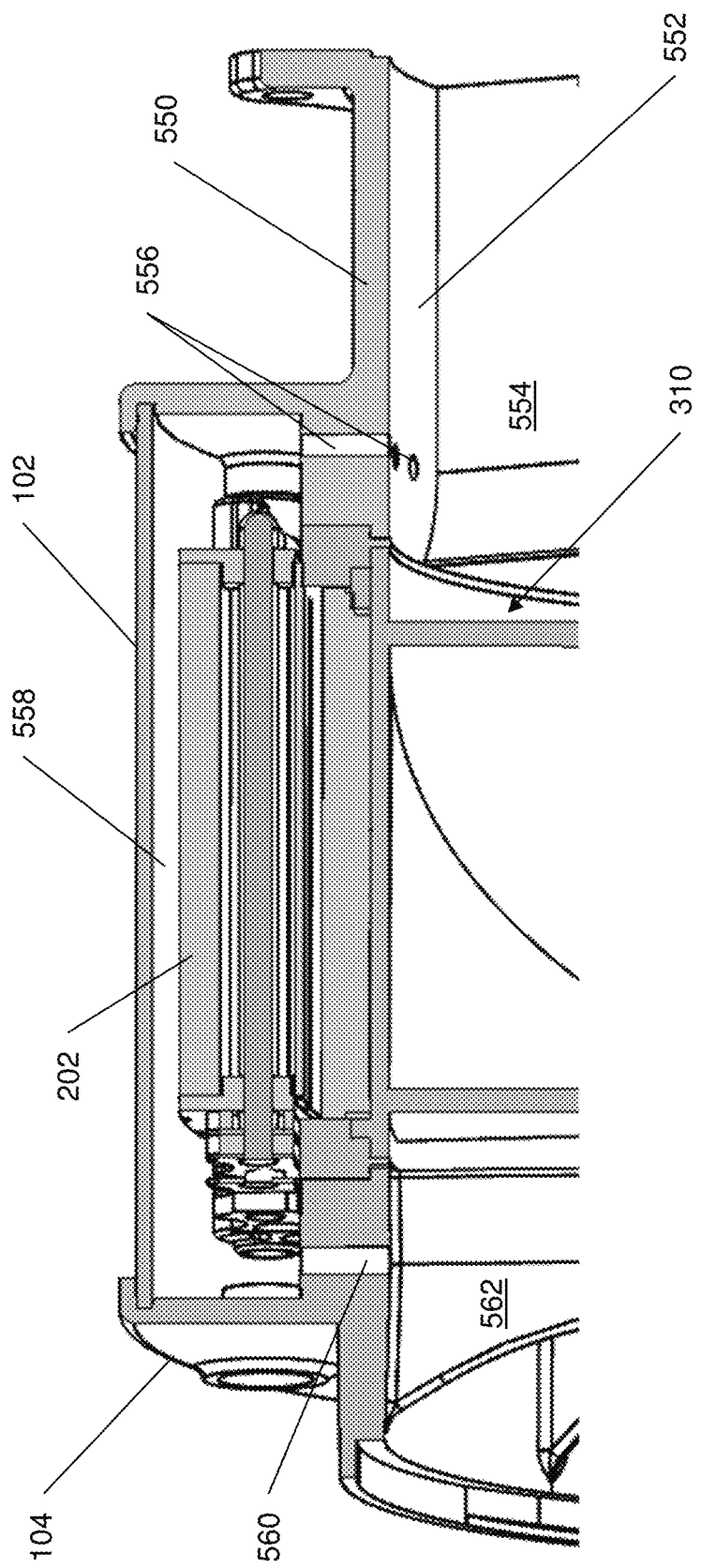
FIG. 5F is a detailed section view of an assembled motor assembly coupled to a housing portion.

FIG. 5E illustrates an assembled motor 100 coupled to the intake stabilizer 104 and the pump housing portion 550. FIG. 5F is a detailed section view of one side of the motor 100 coupled to the intake stabilizer 104 and the pump housing portion 550 which illustrates one method of cooling the motor 100 during operation.

Operation

In operation, as current from a power source (such as a battery) flows into the bus bars and/or coil windings 204 of the stator assembly 200, a magnetic field (not shown) is produced. The magnets or magnetic material in the rotor 302 are either attracted to or repelled by the magnetic field of the stator assembly 200 and will begin to rotate relative to the magnetic field of the stator assembly. A controller (not shown) shifts current from one set of bus-bars 204 to the next set which produces a rotating magnetic field which the magnetic rotor 302 will follow. Because the impeller 310 is mechanically coupled to the rotor 302, the impeller will rotate or spin with the rotor around the stationary shaft 502. In aquatic situations, vibration stability may be controlled by the intake stabilizer 104, front and rear seals 214-212 which filter out much of the low gravity solids and free iron entering the space separating the stator and rotor assemblies. The non-ferrous impeller 310 also functions as a centralized brace for holding the thin-walled rotor 302 in a cylindrical shape.

As is well known, during operation conventional electric motors will typically generate heat and cooling systems are introduced to manage the heat produced by the motor. In a conventional marine motorcraft cooling system, water is typically captured coming out of the propulsion system, removed from the fluid flow of the system, used to cool the motor or electronics, then the water is reintroduced back into the environment-resulting in less propulsion available to the system because some of the flow is used for cooling and not propulsion.

As illustrated in FIG. 5F, water immediately exiting the impeller 310 is "flung" against an interior wall 552 of the pump housing portion 550 to create a high pressure, turbulent zone 554 of flow and strong water pressure. In certain embodiments, water from the high pressure zone 554 will be injected into inlet apertures 556 defined in the interior wall 552 of the pump housing component 550. In turn, the injected water exiting the inlet apertures 556 creates a high pressure zone 558 between the stator yoke 202 and the sleeve 102—which creates a fluid flow towards the intake stabilizer 104 and exits through a plurality of outlet apertures 560. The water is then reintroduced into the lower pressure flow 562 on the inlet side of the impeller 310. This creates a zero loss or near zero loss cooling system which will result in minimal loss of back pressure or minimal negative effects on the propulsion of the system.

Any low gravity solids and solids should be able to flow through the inlet openings 556 because they will be carried by the flow of the water circulating in zone 558. In order to ensure that the solids are not caught in zone 558, the inlet apertures 556 are of a smaller diameter (e.g., 2 mm) in the high-pressure zone 554 than the diameter of the outlet apertures 560 (e.g. 3 mm) so that if any solids enter into the pressure zone 558 will be flushed out by the pressurized water flow circulating between the stator yoke 202 and the sleeve 102.

The abstract of the disclosure is provided for the sole reason of complying with the rules requiring an abstract, which will allow a searcher to quickly ascertain the subject matter of the technical disclosure of any patent issued from this disclosure. It is submitted with the understanding that it will not be used to interpret or limit the scope or meaning of the claims.

Any advantages and benefits described may not apply to all embodiments of the invention. When the word "means" is recited in a claim element, Applicant intends for the claim element to fall under 35 USC 112 (f). Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC 112 (f).

The foregoing description of the embodiments of the invention has been presented for the purposes of illustration and description. It is not intended to be exhaustive or to limit the invention to the precise form disclosed. Many combinations, modifications and variations are possible in light of the above teaching. For instance, in certain embodiments, each of the above described components and features may be individually or sequentially combined with other components or features and still be within the scope of the present invention. Undescribed embodiments which have interchanged components are still within the scope of the present invention. It is intended that the scope of the invention be limited not by this detailed description, but rather by the claims.

What is claimed is:

1. A motor having a longitudinal axis, the motor comprising:
   a stator assembly centered around the longitudinal axis, the stator assembly including,
      a cylindrically shaped stator yoke having an inward surface defining a plurality of inward radially projecting fingers forming a plurality of longitudinal spaces circumferentially positioned about the longitudinal axis;
      a plurality of groups of longitudinal electrical conductors positioned within the plurality of longitudinal spaces;

a first alignment ring positioned longitudinally adjacent to a first end of the stator yoke having a plurality of circumferentially spaced apertures for engaging and positioning the plurality of electrical conductors;

a second alignment ring positioned longitudinally adjacent to a second end of the stator yoke having a plurality of circumferentially spaced apertures for engaging and positioning the plurality of electrical conductors;

a plurality of connecting conductors positioned longitudinally adjacent to the first alignment ring and electrically coupling the electrical conductors of each group together;

a first multi-step water resistant circular seal positioned longitudinally adjacent to the first end of the stator yoke;

a second multi-step water resistant circular seal positioned longitudinally adjacent to the second end of the stator yoke;

a rotor assembly concentrically centered about the longitudinal axis with respect to the stator assembly and positioned within the stator assembly; the rotor assembly including,
a cylindrically shaped rotor yoke coupled to a plurality of elongated magnets circumferentially spaced about an exterior surface of the rotor yoke;
wherein the rotor yoke includes an interior surface defining a first plurality of circumferentially spaced torque transfer surfaces;

an impeller concentrically centered about the longitudinal axis and positioned within the rotor assembly, the impeller including,
a cylindrical shaped outer shell having an exterior surface defining a second plurality of circumferentially spaced torque transfer surfaces sized and shaped to engage the first plurality of torque transfer surfaces;
a center shaft;
a non-rotating stabilizing shaft positioned concentrically within the center shaft; and
at least one blades coupling the center shaft to the outer shell.

2. The motor of claim 1, further comprising at least one bearing assembly positioned about the stabilizing shaft for allowing the center shaft of the impeller to rotate about the stabilizing shaft.

3. The motor of claim 1, further comprising an intake stabilizer coupling to a first end of the non-rotating stabilizing shaft.

4. The motor of claim 3, wherein the intake stabilizer comprises a circular support structure for coupling to the motor, a center coupling component aligned with the stabilizing shaft, and a plurality of fins connecting the circular support structure to the center coupling component.

5. The motor of claim 3, wherein the first alignment ring includes a plurality of positioning apertures for coupling to a plurality of fasteners coupled to a circular support of the intake stabilizer.

6. The motor of claim 1, wherein at least one end of the stabilizing shaft is threaded to couple with a support structure housing the motor.

7. The motor of claim 1, wherein the second alignment ring includes a plurality of positioning apertures for coupling to a plurality of fasteners coupled to a support structure housing for the motor.

8. The motor of claim 1, further comprising a cylindrical sleeve concentrically centered about the longitudinal axis and positioned over the stator yoke to form a cooling channel of recirculating water for the stator yoke.

9. A motor having a longitudinal axis, the motor comprising:
a stator assembly centered around the longitudinal axis, the stator assembly including,
a cylindrically shaped stator yoke having an inward surface defining a plurality of inward radially projecting fingers forming a plurality of longitudinal spaces circumferentially positioned about the longitudinal axis;
a plurality of groups of longitudinal electrical conductors positioned within the plurality of longitudinal spaces;
a first alignment ring positioned longitudinally adjacent to a first end of the stator yoke having a plurality of circumferentially spaced apertures for engaging and positioning the plurality of electrical conductors;
a second alignment ring positioned longitudinally adjacent to a second end of the stator yoke having a plurality of circumferentially spaced apertures for engaging and positioning the plurality of electrical conductors;
a plurality of connecting conductors positioned longitudinally adjacent to the first alignment ring and electrically coupling the electrical conductors of each group together;
a first multi-step water resistant circular seal positioned longitudinally adjacent to the first end of the stator yoke;
a second multi-step water resistant circular seal positioned longitudinally adjacent to the second end of the stator yoke;
a rotor assembly concentrically centered about the longitudinal axis with respect to the stator assembly and positioned within the stator assembly; the rotor assembly including,
a cylindrically shaped rotor yoke coupled to a plurality of elongated magnets circumferentially spaced about an exterior surface of the rotor yoke;
wherein the rotor yoke includes an interior surface defining a first plurality of circumferentially spaced torque transfer surfaces;
an impeller concentrically centered about the longitudinal axis and positioned within the rotor assembly, the impeller including,
a cylindrical shaped outer shell having an exterior surface defining a second plurality of circumferentially spaced torque transfer surfaces sized and shaped to engage the first plurality of torque transfer surfaces;
a center shaft;
at least one blades coupling the center shaft to the outer shell;
wherein the electrical conductors within the plurality of groups of longitudinal electrical conductors are u-shaped conductors having a first leg positioned within a first longitudinal space of the plurality of longitudinal spaces and a second leg positioned within an adjacent space of the plurality of longitudinal spaces, and
wherein the plurality of connecting conductors is a plurality of semi-circular shaped bus-bars having a rectangular cross section and apertures for engaging ends of a group of longitudinal electrical conductors.

10. The motor of claim 9, wherein the longitudinal electrical conductors within the plurality of groups of electrical conductors are hairpin bus-bars.

11. The motor of claim 9, wherein the electrical conductors within the plurality of groups of electrical conductors are coil-windings.

12. The motor of claim 9, further comprising insulating rings positioned between layers of connecting conductors.

13. A motor having a longitudinal axis, the motor comprising:
   a stator assembly centered around the longitudinal axis, the stator assembly including,
      a cylindrically shaped stator yoke having an inward surface defining a plurality of inward radially projecting fingers forming a plurality of longitudinal spaces circumferentially positioned about the longitudinal axis;
      a plurality of groups of longitudinal electrical conductors positioned within the plurality of longitudinal spaces;
      a first alignment ring positioned longitudinally adjacent to a first end of the stator yoke having a plurality of circumferentially spaced apertures for engaging and positioning the plurality of electrical conductors;
      a second alignment ring positioned longitudinally adjacent to a second end of the stator yoke having a plurality of circumferentially spaced apertures for engaging and positioning the plurality of electrical conductors;
      a plurality of connecting conductors positioned longitudinally adjacent to the first alignment ring and electrically coupling the electrical conductors of each group together;
      a first multi-step water resistant circular seal positioned longitudinally adjacent to the first end of the stator yoke;
      a second multi-step water resistant circular seal positioned longitudinally adjacent to the second end of the stator yoke;
   a rotor assembly concentrically centered about the longitudinal axis with respect to the stator assembly and positioned within the stator assembly; the rotor assembly including,
      a cylindrically shaped rotor yoke coupled to a plurality of elongated magnets circumferentially spaced about an exterior surface of the rotor yoke;
      wherein the rotor yoke includes an interior surface defining a first plurality of circumferentially spaced torque transfer surfaces;
   an impeller concentrically centered about the longitudinal axis and positioned within the rotor assembly, the impeller including,
      a cylindrical shaped outer shell having an exterior surface defining a second plurality of circumferentially spaced torque transfer surfaces sized and shaped to engage the first plurality of torque transfer surfaces;
      a center shaft;
      at least one blades coupling the center shaft to the outer shell;
   wherein the cylindrically shaped stator yoke includes an exterior surface defining a plurality of longitudinal channels circumferentially positioned about the exterior surface to minimize impacts on torque created by an interaction of the stator assembly with rotor assembly.

14. A method of rotating an impeller without a drive shaft, the method comprising:
   concentrically coupling an impeller having a longitudinal axis to an interior surface of a rotor yoke wherein the rotor yoke has an exterior surface containing a plurality of circumferentially spaced elongated magnets;
   positioning the rotor yoke concentrically inside a cylindrical shaped stator yoke wherein the stator yoke comprises an interior defined by longitudinal spaces circumferentially positioned about the longitudinal axis and having one or more groups of conductors positioned within longitudinal spaces;
   electrically coupling individual conductors within each group of conductors to each other;
   energizing at least one group of conductors which causes the elongated magnets to rotate about the longitudinal axis; causing the rotor yoke to rotate which in turn causes the impeller to rotate about the longitudinal axis; and
   stabilizing the rotation of the impeller with a stationary center shaft positioned within the impeller and concentrically centered about the longitudinal axis.

15. The method of claim 14, wherein the step of concentrically coupling an impeller to an interior surface of a rotor yoke further comprises coupling an outer cylindrical shell of the impeller to an interior surface of the rotor yoke.

16. The method of claim 14, further comprising hydraulically sealing a void between exterior surfaces of rotor magnets and inward facing surfaces of the stator yoke.

17. The method of claim 14, further comprising cooling a motor by flowing fluids through longitudinal detents defined within an exterior surface of the stator yoke.

18. The method of claim 14, wherein the stabilizing includes coupling one end of the stationary shaft to an intake stabilizer.

19. The method of claim 14, wherein the stabilizing includes coupling one end of the stationary shaft to a support structure housing for a motor.

20. The method of claim 14, further comprising longitudinally aligning the at least one group of conductors by engaging a first end of conductors with a first plurality of apertures defined within a first alignment ring and engaging a second end of conductors with a second plurality of apertures defined within a second alignment ring.

21. The method of claim 14, wherein the stabilizing includes positioning at least one bearing assembly between a rotating central shaft of the impeller and a stationary central shaft.

22. The method of claim 14, further comprising cooling the stator yoke by exposing the stator yoke to recirculating water taken from a higher pressure zone on a outlet side of the impeller and injecting the water to a lower pressure zone on an inlet side of the impeller.

* * * * *